(12) United States Patent
Baharmand

(10) Patent No.: US 10,791,847 B2
(45) Date of Patent: Oct. 6, 2020

(54) BABY WALKER APPARATUS AND METHOD OF CONTROLLING THE SAME

(71) Applicant: Mohammad Baharmand, Lake Forest, CA (US)

(72) Inventor: Mohammad Baharmand, Lake Forest, CA (US)

( * ) Notice: Subject to any disclaimer, the term of this patent is extended or adjusted under 35 U.S.C. 154(b) by 0 days.

(21) Appl. No.: 16/455,647

(22) Filed: Jun. 27, 2019

(65) Prior Publication Data

US 2020/0163467 A1   May 28, 2020

Related U.S. Application Data

(60) Provisional application No. 62/771,068, filed on Nov. 24, 2018.

(51) Int. Cl.
| | |
|---|---|
| *A47D 13/04* | (2006.01) |
| *G08B 21/02* | (2006.01) |
| *G05D 1/02* | (2020.01) |
| *G05D 1/00* | (2006.01) |

(52) U.S. Cl.
CPC ......... *A47D 13/043* (2013.01); *G05D 1/0214* (2013.01); *G08B 21/0205* (2013.01); *G05D 1/0011* (2013.01)

(58) Field of Classification Search
CPC .... G05D 1/0214; B62B 3/02; G08B 21/0205; A47D 13/043
See application file for complete search history.

(56) References Cited

U.S. PATENT DOCUMENTS

| | | | | |
|---|---|---|---|---|
| 5,480,210 A | * | 1/1996 | Lehenbauer | A47D 1/002 297/137 |
| 5,713,586 A | * | 2/1998 | Haller | A47D 13/043 180/169 |
| 6,068,273 A | * | 5/2000 | Rao | A61H 3/04 280/33.994 |
| 6,983,813 B1 | * | 1/2006 | Wright | A47D 1/10 180/11 |
| 2015/0108731 A1 | * | 4/2015 | Asfa | A47D 13/043 280/87.051 |
| 2018/0129198 A1 | * | 5/2018 | Gronwald | G05D 1/0011 |

* cited by examiner

*Primary Examiner* — John D Walters
*Assistant Examiner* — James J Triggs

(57) ABSTRACT

A baby walker comprises sensors and control mechanisms to detect dangerous situations and to stop or substantially slow the baby walker. The baby walker uses proximity sensors, position sensors, presence sensors, and/or communication modules in order to assess the environment for the safety of the child. It also includes a controller that can apply a brake to the wheel assembly to stop or substantially slow the baby walker so as to protect the baby from entering dangerous regions or come in close proximity to objects. The baby walker may further receive and/or transmit information from an external device which may be operated by the child's guardian to define the borders of dangerous regions or a predefined travel distance.

9 Claims, 11 Drawing Sheets

BABY WALKER APPARATUS AND METHOD OF CONTROLLING THE SAME

CROSS REFERENCE TO RELATED APPLICATIONS

The present patent application is a formalization of a previously filed provisional patent application entitled "BABY WALKER APPARATUS AND METHOD OF CONTROLLING THE SAME," filed 2018 Nov. 24, as U.S. patent application Ser. No. 62/771,068 by the inventor(s) named in this application. This patent application claims the benefit of the filing date of the cited provisional patent application according to the statutes and rules governing provisional patent applications, particularly 35 USC § 119 and 37 CFR § 1.78. The specification and drawings of the cited provisional patent application are specifically incorporated herein by reference.

COPYRIGHT

A portion of the disclosure of this patent document contains material which is subject to copyright protection. The owner has no objection to the facsimile reproduction by anyone of the patent disclosure, as it appears in the Patent and Trademark Office files or records, but otherwise reserves all copyright rights whatsoever.

FIELD OF INVENTION

The present invention, relates to a baby walker and method of monitoring and controlling the same. In particular, the baby walker comprises a number of sensors and control mechanisms to protect the baby seated within the baby walker. In several preferred embodiments, the baby walker uses one or more sensors to detect objects, terrain, position, and presence and may apply a brake to stop or substantially slow the baby walker so as to protect the baby from entering dangerous regions or come in close proximity to objects. The baby walker may further comprise a communication module to communicate with an external devise to receive and/or transmit information including signals that contain the coordinates of safe and dangerous regions.

BACKGROUND

A baby walker enables a child to learn how to walk without the help of his/her parents. It is an apparatus with wheels and a seating/walking arrangement for the child so that the baby, on his/her own power, may propel the walker in all directions and orientations at his/her choosing. The child in the baby walker can thus move around from one place to another without the help or supervisor of his/her parents.

Due to their simplicity, convenience of use, and the child's own control of its mobility, a baby walker can be a dangerous device. Every year in the United States and abroad, numerous children are injured as a result of baby walker accidents. These injuries occur when the baby walker is tipped over, shoved, skidded, toppled, or the like. In addition, because the baby walker is controlled by the child, the baby walker can travel to dangerous locations that can harm the child. These locations include stairs, swimming pools, kitchens, or any other place where the baby walker places the baby in close proximity to a potential harmful object.

Parents also desire to know the presence of the child inside the baby walker and be notified if the child in no longer present within it. In addition, parents would prefer to define predetermined distances and regions for the baby walker to avoid accidents. Therefore, there is a need for a baby walker that can monitored and controlled in order to prevent child injuries.

SUMMARY

In one aspect, a baby walker is disclosed wherein the baby walker comprises a walking assembly including a plurality of wheel assemblies, a proximity sensor operative to detect an object and generate a proximity signal, and a controller, including a processing unit and program code stored on a storage device of said controller, said controller is coupled with the proximity sensor and at least one of the plurality of wheel assemblies, wherein the controller is configured to receive the proximity signal, via the proximity sensor, and to apply a brake signal to the at least one of the plurality of wheel assemblies to one of substantially slow and stop the baby walker when a first distance between the object and the baby walker is less than a first predetermined value.

Preferably, the walking assembly comprises an upper member, a seat rotatably coupled with the upper member, and a lower member coupled with the upper member, wherein the plurality of wheel assemblies are coupled with the lower member.

Preferably, the at least one of the plurality of wheel assemblies comprises a housing rotatably coupled with the lower member, a wheel rotatably coupled with the housing, and a braking system operative to engage the wheel to one of substantially slow and stop the wheel.

Preferably, the wheel comprises a plurality of holes disposed circumferentially around a center of the wheel and wherein the braking system is a solenoid actuator operative to receive the brake signal and actuate a rod into one of the plurality of holes to stop the baby walker.

Preferably, the braking system is an electrical motor having a shaft rotatably coupled with the wheel and wherein the motor is operative to receive the brake signal and apply a torque on the shaft to substantially slow the baby walker.

Preferably, the proximity sensor comprises one of an infrared sensor and an ultrasonic sensor.

Preferably, the baby walker further comprises a position sensor operative to detect a position of the baby walker and generate a position signal, wherein the controller is further coupled with the position sensor and further configured to receive the position signal, via the position sensor, and to apply the brake signal to the at least one of the plurality of wheel assemblies to one of substantially slow and stop the baby walker when a second distance between the position and a starting position of the baby walker is greater than a second predetermined value.

Preferably, the position sensor comprises at least one of Global Positioning System (GPS), a rotary encoder, an optical sensor, a LiDAR sensor, an infrared sensor, and an ultrasonic sensor.

Preferably, the baby walker further comprises a position sensor operative to detect a position of the baby walker and generate a position signal, wherein the controller is further coupled with the position sensor and further configured to receive the position signal, via the position sensor, and to apply the brake signal to the at least one of the plurality of wheel assemblies to one of substantially slow and stop the baby walker when a coordinate of the position resides one of inside and outside of a predetermined region.

Preferably, the baby walker further comprises a communication module operative to at least one of receive and transmit radio waves, wherein the controller is further coupled with the communication module and further configured to receive a plurality of coordinates of the predetermined region from an external device.

Preferably, the predetermined region is at least one of a baby room, a swimming pool, a living room, and a kitchen of a house.

Preferably, the baby walker further comprises a weight sensor operative to detect a weight of a baby and generate a weight signal, and a communication module operative to at least one of receive and transmit radio waves, wherein the controller is further coupled with the weight sensor and the communication module and further configured to receive the weight signal, via the weight sensor, and to transmit a warning signal, via the communication module when the weight is less than a second predetermined value.

Preferably, the weight sensor comprises a load cell and the communication module comprises at least one of a WIFI module and a Bluetooth module.

In another aspect, a method of monitoring and controlling a baby walker is disclosed wherein said baby walker comprises a walking assembly including a plurality of wheel assemblies, a proximity sensor, and a controller, wherein said method comprises detecting an object, via the proximity sensor, generating a proximity signal, via the proximity sensor, receiving the proximity signal, via the controller, and applying a brake signal to at least one of the plurality of wheel assemblies to one of substantially slow and stop the baby walker when a first distance between the object and the baby walker is less than a first predetermined value, via the controller.

Preferably, the baby walker further comprises a position sensor, and said method further comprises detecting a position of the baby walker, via the position sensor, generating a position signal, via the position sensor, receiving the position signal, via the controller, and applying the brake signal to at least one of the plurality of wheel assemblies to one of substantially slow and stop the baby walker when a second distance between the position and a starting position of the baby walker is greater than a second predetermined value, via the controller.

Preferably, the baby walker further comprises a position sensor, and said method further comprises detecting a position of the baby walker, via the position sensor, generating a position signal, via the position sensor, receiving the position signal, via the controller, and applying the brake signal to at least one of the plurality of wheel assemblies to one of substantially slow and stop the baby walker when a coordinate of the position resides one of inside and outside of a predetermined region, via the controller.

Preferably, the baby walker further comprises a communication module, and said method further comprises receiving a plurality of coordinates of the predetermined region from an external device.

Preferably, the baby walker further comprises a weight sensor and a communication module, and said method further comprises detecting a weight of a baby, via the weight sensor, generating a weight signal, via the weight sensor, receiving the weight signal, via the controller, and transmitting a warning signal when the weight is less than a second predetermined value, via the communication module.

In another aspect, a method of walking a baby via a baby walker is disclosed wherein the method comprises providing a walking assembly including a plurality of wheel assemblies, providing a proximity sensor operative to detect an object and generate a proximity signal, and providing a controller, including a processing unit and program code stored on a storage device of said controller, said controller is coupled with the proximity sensor and at least one of the plurality of wheel assemblies, wherein the controller is configured to receive the proximity signal, via the proximity sensor, and to apply a brake signal to the at least one of the plurality of wheel assemblies to one of substantially slow and stop the baby walker when a first distance between the object and the baby walker is less than a first predetermined value.

Preferably, the method further comprises providing a position sensor operative to detect a position of the baby walker and generate a position signal, wherein the controller is further coupled with the position sensor and further configured to receive the position signal, via the position sensor, and to apply the brake signal to the at least one of the plurality of wheel assemblies to one of substantially slow and stop the baby walker when a second distance between the position and a starting position of the baby walker is greater than a second predetermined value.

Preferably, the method further comprises providing a position sensor operative to detect a position of the baby walker and generate a position signal, wherein the controller is further coupled with the position sensor and further configured to receive the position signal, via the position sensor, and to apply the brake signal to the at least one of the plurality of wheel assemblies to one of substantially slow and stop the baby walker when a coordinate of the position resides one of inside and outside of a predetermined region.

Preferably, the method further comprises providing a communication module operative to at least one of receive and transmit radio waves, wherein the controller is further coupled with the communication module and further configured to receive a plurality of coordinates of the predetermined region from an external device.

Preferably, the method further comprises providing a weight sensor operative to detect a weight of a baby and generate a weight signal, and providing a communication module operative to at least one of receive and transmit radio waves, wherein the controller is further coupled with the weight sensor and the communication module and further configured to receive the weight signal, via the weight sensor, and to transmit a warning signal, via the communication module when the weight is less than a second predetermined value.

In another aspect, a baby walker is disclosed wherein the baby walker comprises a walking assembly including a plurality of wheel assemblies, a position sensor operative to detect a position of the baby walker and generate a position signal, and a controller, including a processing unit and program code stored on a storage device of said controller, said controller is coupled with the position sensor and at least one of the plurality of wheel assemblies, wherein the controller is configured to receive the position signal, via the position sensor, and to apply a brake signal to the at least one of the plurality of wheel assemblies to one of substantially slow and stop the baby walker when at least one of a distance between the position and a starting position of the baby walker is greater than a predetermined value, a coordinate of the position resides inside of a predetermined region, and a coordinate of the position resides outside of a predetermined region.

In another aspect, a method of monitoring and controlling a baby walker is disclosed wherein said baby walker comprises a walking assembly including a plurality of wheel assemblies, a position sensor, and a controller, and wherein said method comprises detecting a position of the baby walker, via the position sensor, generating a position signal, via the position sensor, receiving the position signal, via the controller, and applying a brake signal to at least one of the plurality of wheel assemblies to one of substantially slow and stop the baby walker when at least one of a distance between the position and a starting position of the baby walker is greater than a predetermined value, a coordinate of the position resides inside of a predetermined region, and a coordinate of the position resides outside of a predetermined region, via the controller.

DETAILED DESCRIPTION OF THE PRESENTLY PREFERRED EMBODIMENTS

Figure 1A:
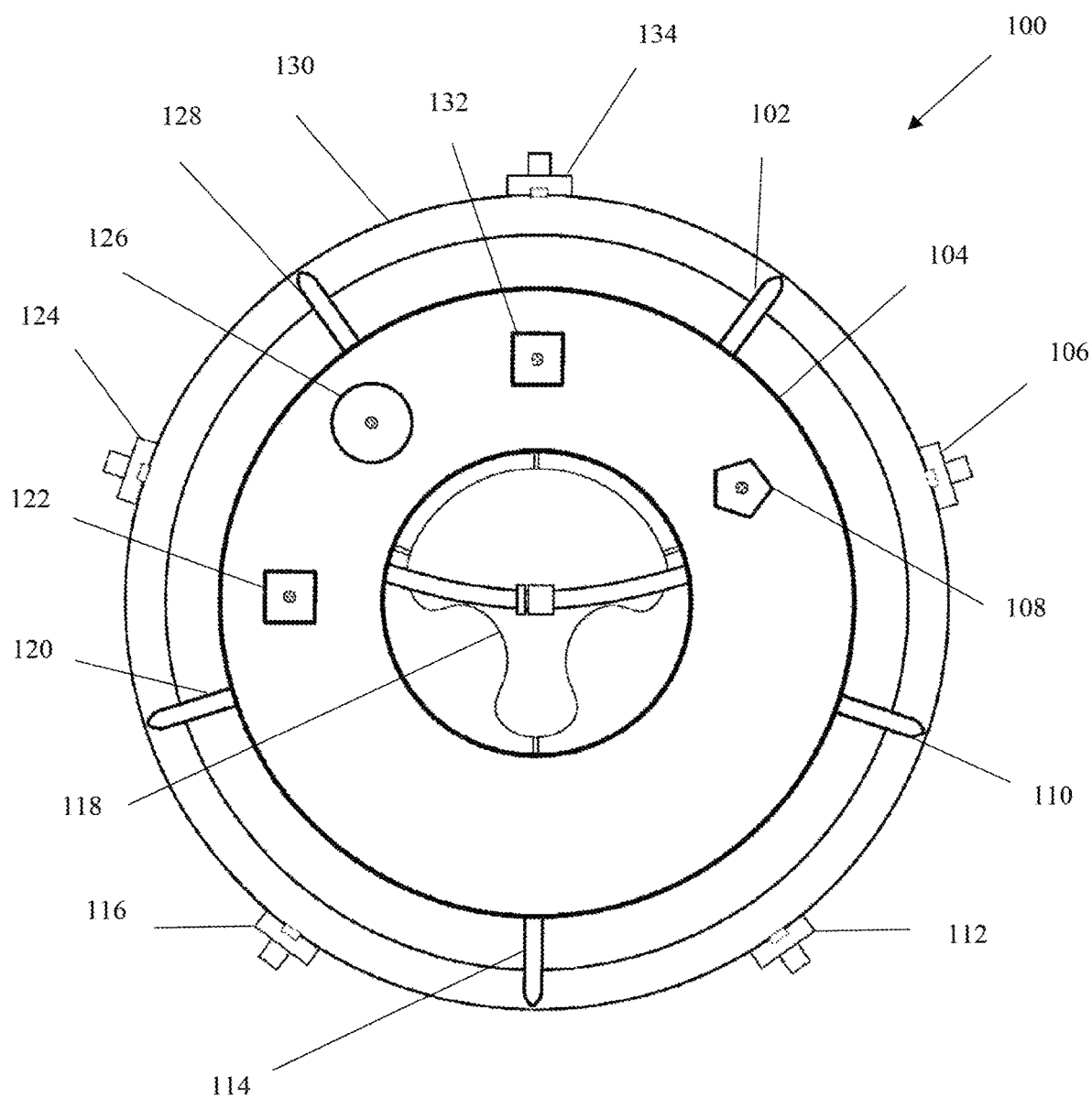
FIG. 1A shows a top view of a baby walker according to a preferred embodiment of the present invention.
Figure 1B:
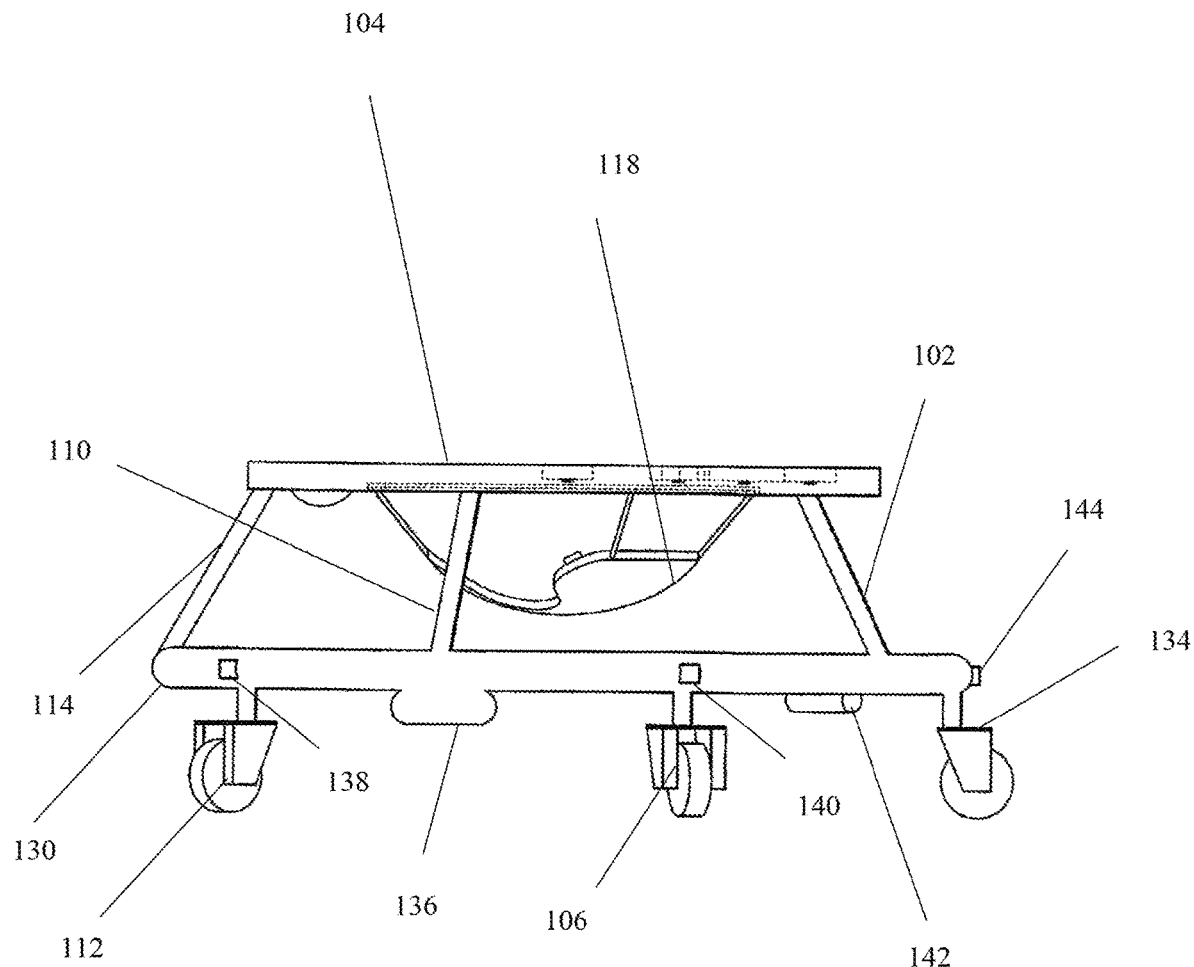
FIG. 1B shows a side view of the baby walker shown in FIG. 1A.
Figure 1C:
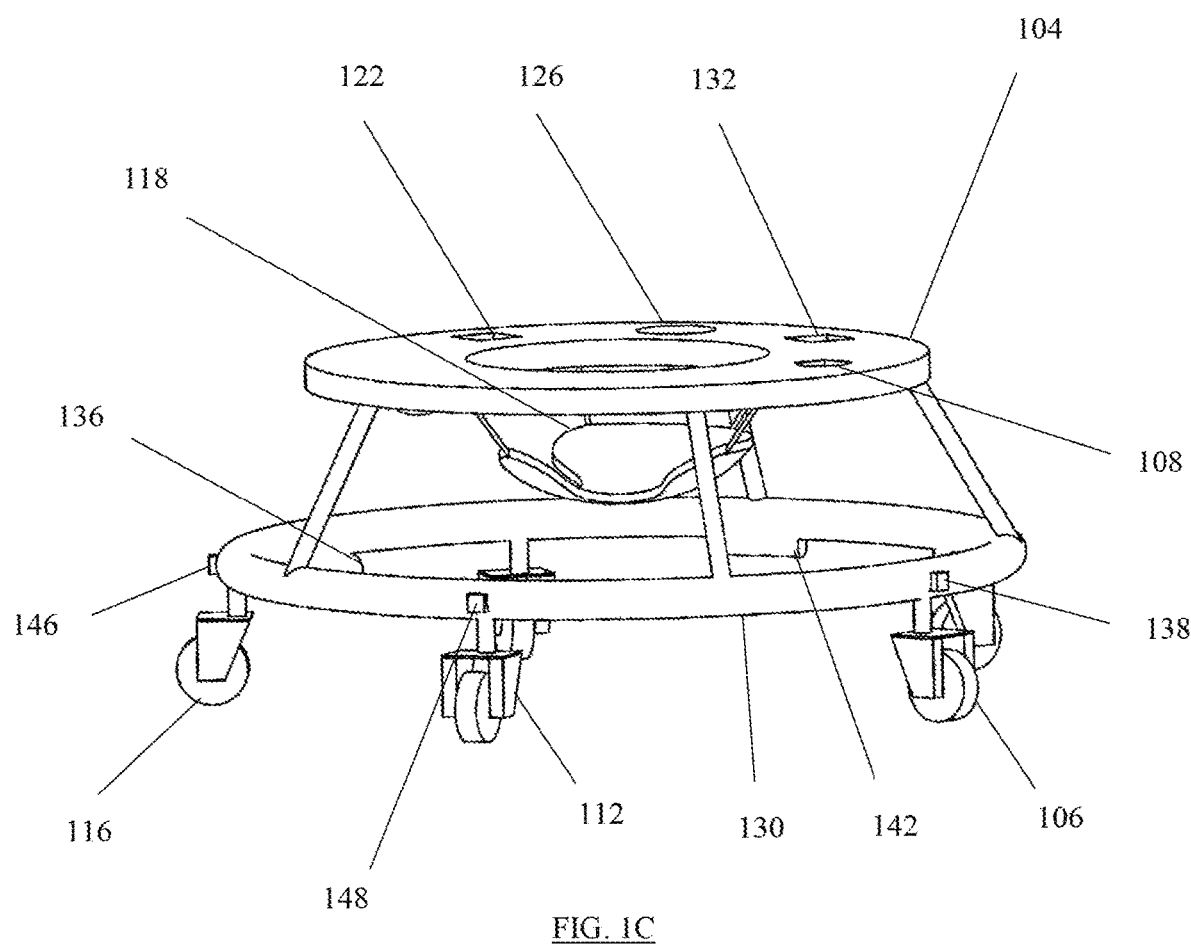
FIG. 1C shows a perspective view of the baby walker shown in FIG. 1A.

FIGS. 1A through 1C depict front, side, and perspective views, respectively, of a baby walker 100 which comprises a walking assembly, including a plurality of wheel assemblies, and it is equipped with sensors and a controller so as to monitor and control the baby walker 100. The controller is configured to receive signals from the sensors and to control the movements of the baby walker 100. The baby walker is further equipped with a communication module to receive and/or transmit, through radio waves, signals from/to an external device. Accordingly, the baby walker 100 is capable of ascertaining the surrounding conditions, such as proximity of objects, topography of the environment, its position with respect to a starting position or predefined regions, and the presence or absence of the baby inside the baby walker 100. The baby walker 100 is also equipped with braking mechanisms that will substantially slow or stop the baby walker 100 to protect the baby from entering dangerous regions or come in close proximity to objects.

The baby walker 100 comprises a walking assembly which includes a plurality of wheel assemblies. In this preferred embodiment, the baby walker 100 comprises five wheel assemblies 106, 112, 116, 124, and 134. The walking assembly comprises an upper member 104, a seat 118 which is rotatably coupled with the upper member 104, and a lower member 130 which is coupled with the upper member 104. According to this preferred embodiment, the lower member 130 is coupled with the upper member 104 through five struts 102, 110, 114, 120, and 128.

In this preferred, embodiment, the baby walker 100 comprises five sensors 138, 140, 144, 146, and 148. The sensors 138, 148, and 146 are proximity sensors operative to detect objects that come in close proximity to the baby walker 100 and generate proximity signals. The sensor 140 is a position sensor operative to detect a position of the baby walker 100 and generate a position signal. The sensor 144 is a weight sensor operative to detect a weight of a baby that is seated in the baby walker 100 and generate a weight signal. The baby walker 100 further comprises a communication module 142 operative to at least one of receive and transmit radio waves. One or more of the plurality of wheel assemblies 106, 112, 116, 124, and 134, comprises a braking system, discussed in greater detail below, operative to engage the wheel to one of substantially slow and stop the wheel. A controller 136 is coupled to and in communication with the sensors 138, 140, 144, 146, 148, the communication module 142, and the one or more of the plurality of wheel assemblies 106, 112, 116, 124, and 134.

A proximity sensor is a sensor that can detect the presence of nearby objects without any physical contact. Common proximity sensors emit an electromagnetic field or a beam of electromagnetic radiation, for instance in the infrared spectrum, and detects changes in the return signal. As the object gets closer to the proximity sensor, the signal is increased in value so as to indicate the distance between the object and the sensor. Different types of proximity sensors may be utilized to detect metallic and nonmetallic objects. Such proximity sensors include capacitive proximity sensor, photoelectric sensor, and an inductive proximity sensor. According to a preferred embodiment, the proximity sensors 138, 146, and 148 include infrared sensors and ultrasonic sensors. The HC-SR04 ultrasonic sensor and the GP2Y0A21YK infrared sensor, both available from SparkFun Electronics of Niwot of Colo., may be utilized.

The position sensor 140 may include one or more of a Global Positioning System (GPS), a rotary encoder, an optical sensor, a LiDAR sensor, an infrared sensor, and an ultrasonic sensor. The GPS operates to at least receive the (x, y, z) coordinates of the baby walker 100. The rotary encoder which may be coupled with the wheel assemblies 106, 112, 116, 124, and 134 operates to measure the rotations of the associated wheels and to estimate the position of the baby walker 100 relative to a starting position. The optical sensor and the LiDAR sensor may also be utilized to ascertain the location of the baby walker 100 and/or the distance traveled by the baby walker 100.

The communication module 142 receives and/or transmits radio waves. The communication module 142 maybe the ESP8266 WiFi Module or the HC-05 Bluetooth Module, both available from SparkFun Electronics of Niwot of Colo. The communication module 142 is coupled to and in communication with the controller 136 and can receive coordinates of predetermined regions from an external device. These coordinates along with the position of the baby walker 100 will be used by the controller 136 to determine if and when to apply a brake signal to the wheel assemblies 106, 112, 116, 124, and 134.

The controller 136 is configured to receive the proximity signals from the proximity sensors 138, 146, and 148, the position signal from the position sensor 140, and the weight signal from the weight sensor 114. The controller 136 is configured to apply the brake signal to at least one of the plurality of wheel assemblies 106, 112, 116, 124, and 134 to either substantially slow or stop the baby walker 100 in accordance with the received signals.

For instance, the controller 136 may be configured to receive the proximity signals from the proximity sensors 138, 146, and 148 and to apply the brake signal to the at least one of the plurality of wheel assemblies 106, 112, 116, 124, and 134 to one of substantially slow and stop the baby walker 100 when a first distance between an object and the baby walker 100 is less than a first predetermined value. For example, the first predetermined value maybe 0.5 feet of distance from the baby walker 100.

The controller 136 may be further configured to receive the position signal from the position sensor 140 and to apply the brake signal to the at least one of the plurality of wheel assemblies 106, 112, 116, 124, and 134 to one of substantially slow and stop the baby walker 100 when a second distance between the position and a starting position of the baby walker 100 is greater than a second predetermined value. The second predetermined value maybe 3.0 feet of distance from the starting position of the baby walker 100.

In an alternative embodiment, the controller 136 may be further configured receive the position signal from the position sensor 140 and to apply the brake signal to the at least one of the plurality of wheel assemblies 106, 112, 116, 124, and 134 to one of substantially slow and stop the baby walker 100 when a coordinate of the position resides one of inside and outside of a predetermined region. For instance, the predetermined region may be a baby room, a swimming pool, a living room, and a kitchen of a house, see FIGS. 7 and 9. Specifically, the controller 136 may be configured to apply the brake signal to the at least one of the plurality of wheel assemblies 106, 112, 116, 124, and 134 to one of substantially slow and stop the baby walker 100 when a coordinate of the position resides inside of the swimming pool, the living room, and the kitchen, but allow the baby walker 100 to freely roam around the baby room.

Figure 8:
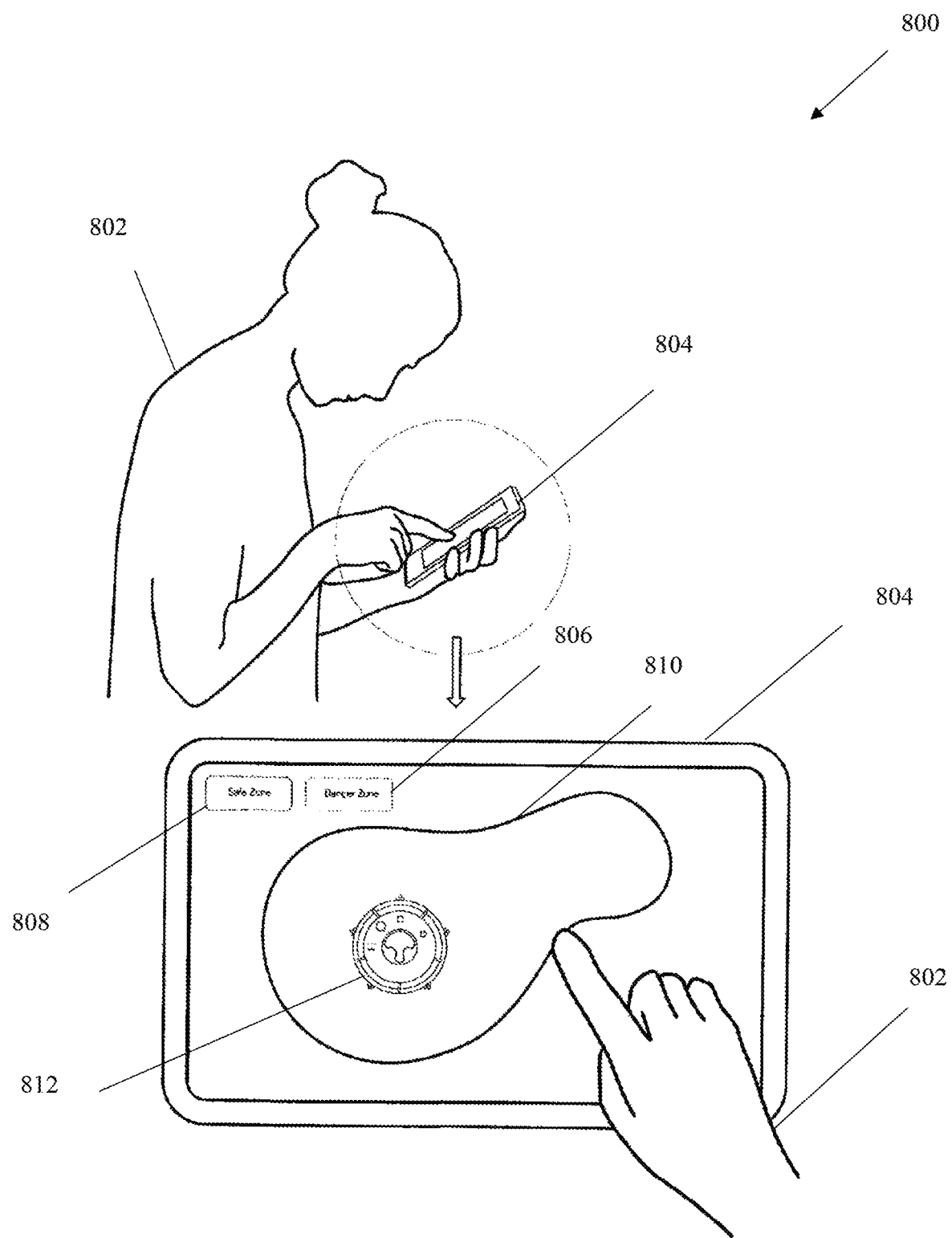
FIG. 8 shows a schematic representation of a user providing a user defined region within which a baby walker may be monitored and controlled according to a preferred embodiment of the present invention.

In yet another alternative embodiment, a user may utilize an external device to draw a region on a screen of the external device, see FIG. 8, within which the baby walker 100 may freely operate. In particular, the controller 136 may be further configured to receive the position signal from the position sensor 140 and to apply the brake signal to the at least one of the plurality of wheel assemblies 106, 112, 116, 124, and 134 to one of substantially slow and stop the baby walker 100 when a coordinate of the position resides outside of the predetermined region.

The controller 136 may be further configured to receive the weight signal from the weight sensor 144 and to transmit a warning signal, via the communication module 142 when the weight is less than a second predetermined value. The second predetermined value may be 15 pounds. Accordingly, the controller 136 is configured to notify the baby's guardian that the baby is no longer seated inside the baby walker 100. According to one preferred embodiment, the weight sensor is a load cell.

The controller 136 maybe analog or digital such as a microcontroller. In one preferred embodiment, the microcontroller is a 68HC08 processor having internal flash memory available from Freescale of Austin, Tex. It is contemplated that the processor may be a combination of individual discrete or separate integrated circuits packaged in a single housing or it may be fabricated in a single integrated circuit.

FIGS. 2A through 5C depict different preferred embodiments of wheel assemblies, at least one of which includes a braking system. A baby walker, such as the baby walker 100, includes a plurality of wheel assemblies, such as the wheel assemblies 106, 112, 116, 124, and 134.

Figures 2A, 2B, 2C:
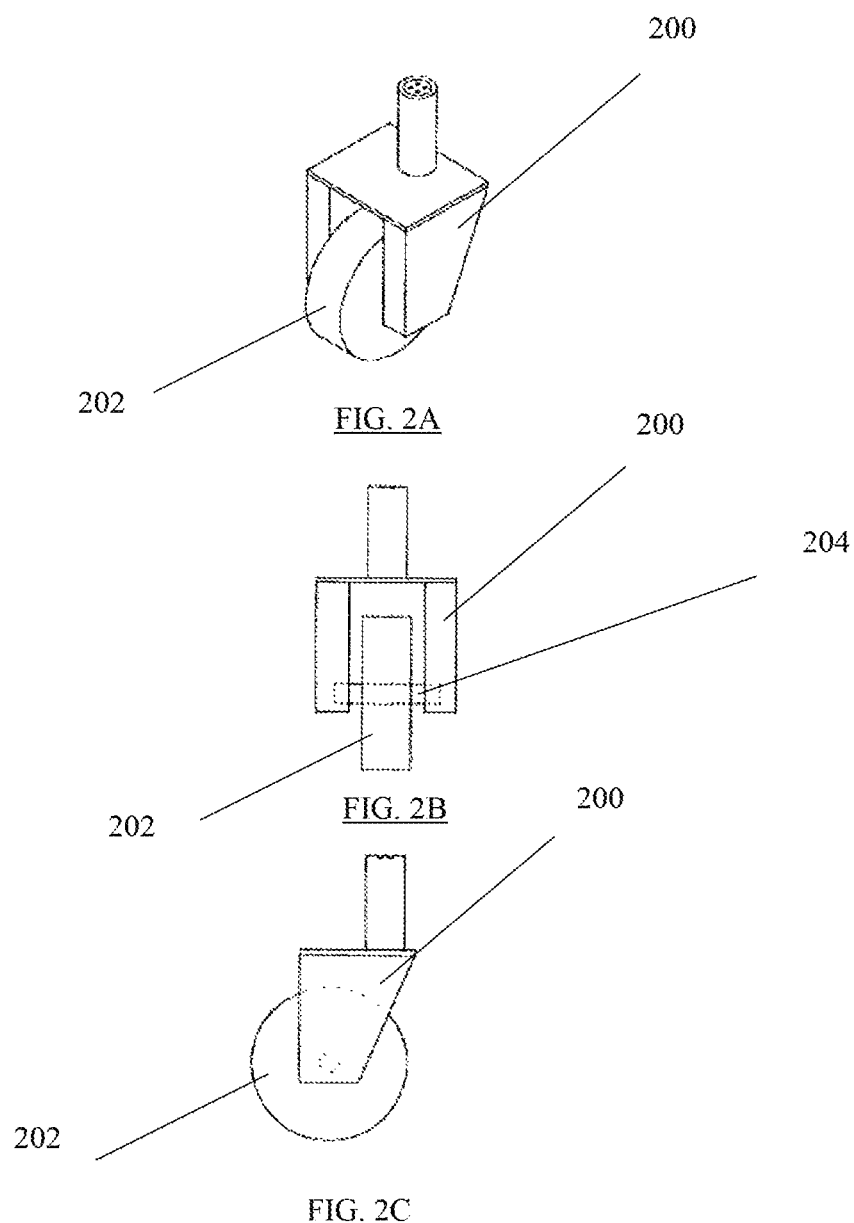
FIG. 2A shows a perspective view of a wheel assembly of a baby walker according to a preferred embodiment of the present invention.
FIG. 2B shows a front view of the wheel assembly of FIG. 2A.
FIG. 2C shows a side view of the wheel assembly of FIG. 2A.

FIG. 2A through 2C depict, perspective, front, and side views, respectively, of a preferred embodiment of a wheel assembly that does not include a braking system. Specifically, the wheel assembly in FIGS. 2A through 2C include a housing 200 which is rotatably coupled with the upper member 104 of the baby walker 100 and a wheel 202 rotatably coupled with the housing 200. FIG. 2B shows how the wheel 202 is rotatably coupled with the housing 200 via a hub 204.

Figures 3A, 3B, 3C:
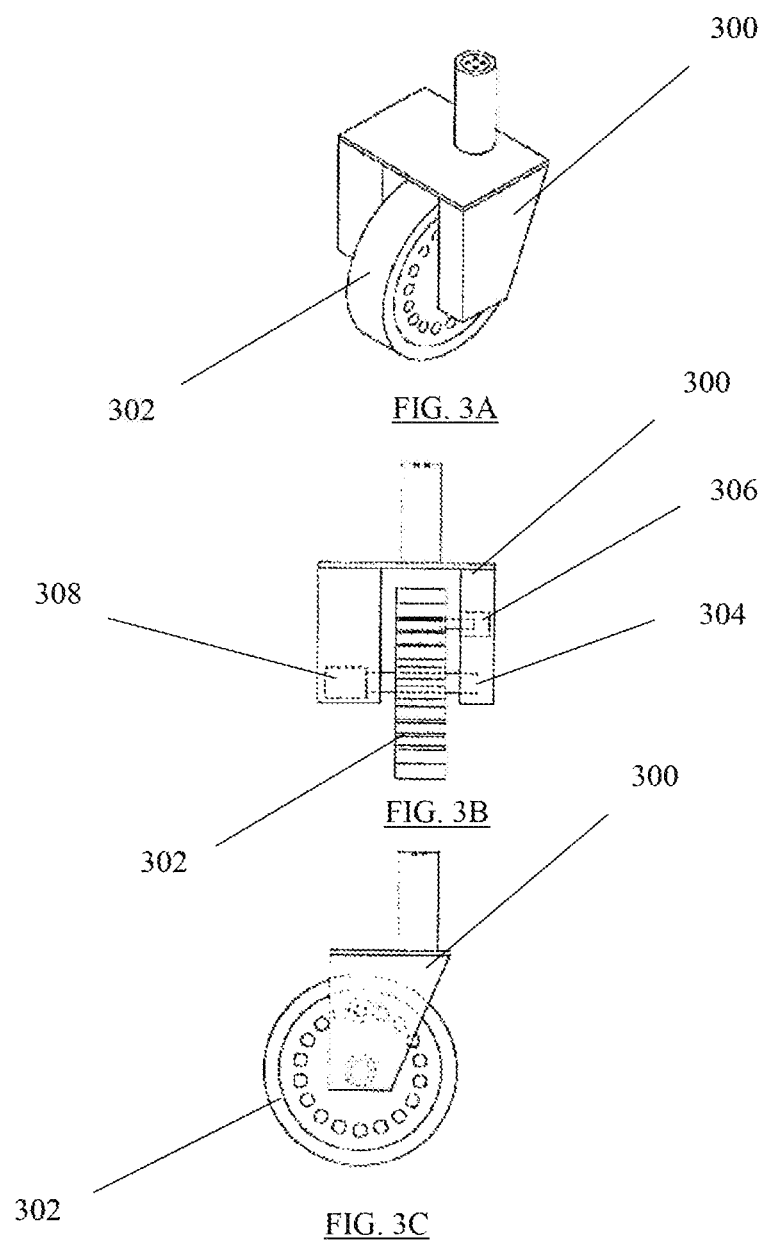
FIG. 3A shows a perspective view of a wheel assembly of a baby walker including a rotary encoder and an electrical motor according to a preferred embodiment of the present invention.
FIG. 3B shows a front view of the wheel assembly of FIG. 3A.
FIG. 3C shows a side view of the wheel assembly of FIG. 3A.

FIGS. 3A through 3C depict, perspective, front, and side views, respectively, of a preferred embodiment of a wheel assembly that includes a braking system and a rotary encoder, the latter can be used in ascertaining the position of the baby walker 100. The wheel assembly in FIGS. 3A through 3C include a housing 300 which is rotatably coupled with the upper member 104 of the baby walker 100. A wheel 302 is rotatably coupled with the housing 300, via a hub 304. An electric motor 308 operates as a braking system. Specifically, a controller, such as the controller 136 applies a brake signal to the motor 308, which in turn applies a torque upon the wheel assembly, to one of substantially slow and stop the baby walker 100 according to the conditions described above. A rotary encoder 306 is a position sensor which is utilized in determining the position of the baby walker 100.

Figure 4A:
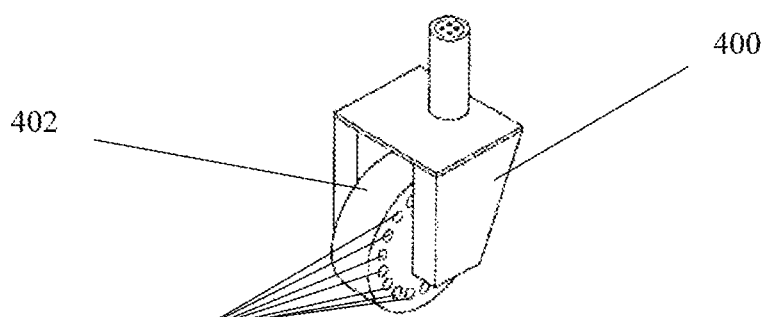
FIG. 4A shows a perspective view of a wheel assembly of a baby walker including a wheel comprising a plurality of holes and a solenoid actuator according to a preferred embodiment of the present invention.
Figures 4B, 4C:
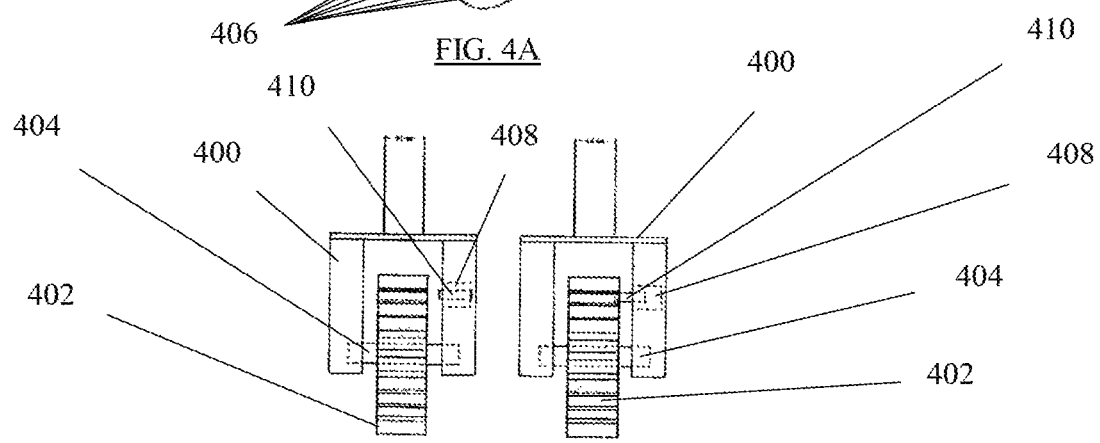
FIG. 4B shows a front view of the wheel assembly of FIG. 4A with the solenoid actuator in a deactivated state.
FIG. 4C shows a front view of the wheel assembly of FIG. 4A with the solenoid actuator in an activated state.
Figure 4D:
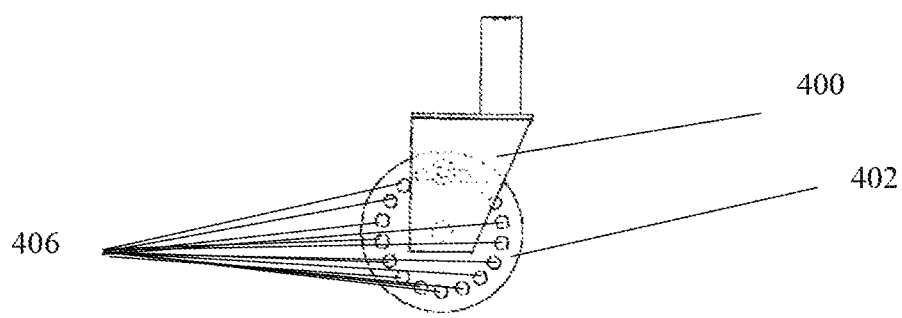
FIG. 4D shows a side view of the wheel assembly of FIG. 4A.

FIGS. 4A through 4D depict, perspective, two front, and side views, respectively, of a preferred embodiment of a wheel assembly that includes a braking system. The wheel assembly in FIGS. 4A through 3D include a housing 400 which is rotatably coupled with the upper member 104 of the baby walker 100. A wheel 402 is rotatably coupled with the housing 400, via a hub 404. A solenoid actuator 408 operates as a braking system. The wheel 402 comprises a plurality of holes 406 which are disposed circumferentially around a center of the wheel 402. The solenoid actuator 408 operates to receive the brake signal form the controller 136 and actuate a rod 410 into one of the plurality of holes 406 to stop the baby walker 100. FIG. 4B shows the actuator 408 in a deactivated state and FIG. 4C show the actuator 408 in an activated state.

Figure 5A:
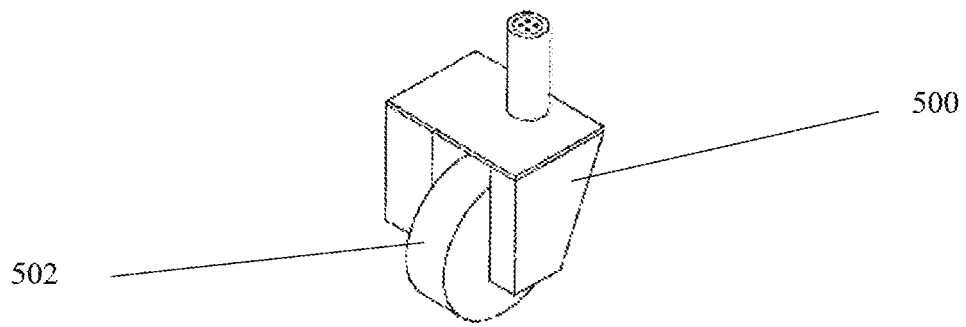
FIG. 5A shows a perspective view of a wheel assembly of a baby walker including an electrical motor according to a preferred embodiment of the present invention.
Figure 5B:
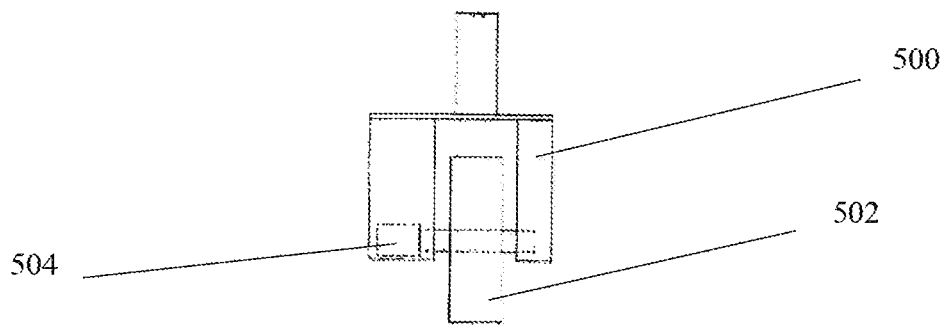
FIG. 5B shows a front view of the wheel assembly of FIG. 5A.
Figure 5C:
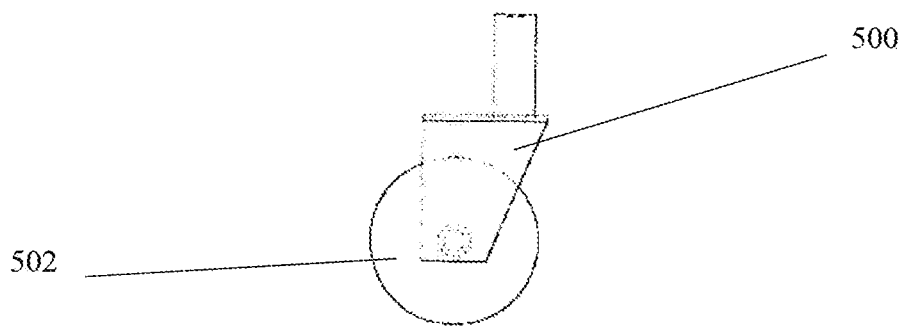
FIG. 5C shows a side view of the wheel assembly of FIG. 5A.

FIGS. 5A through 5C depict, perspective, front, and side views, respectively, of a preferred embodiment of a wheel assembly that includes a braking system. The wheel assembly in FIGS. 5A through 5C include a housing 500 which is rotatably coupled with the upper member 104 of the baby walker 100. A wheel 502 is rotatably coupled with the housing 500, via an electric motor 504 which operates as a hub and a braking system. Specifically, a controller, such as the controller 136 applies a brake signal to the motor 508, which in turn applies a torque upon the wheel assembly, to one of substantially slow and stop the baby walker 100 according to the conditions described above.

Figure 6A:
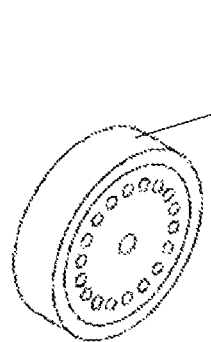
FIG. 6A shows a perspective view of a wheel of a baby walker according to a preferred embodiment of the present invention.
Figure 6B:
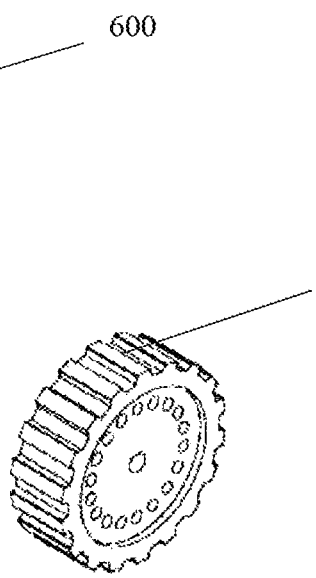
FIG. 6B shows a perspective view of a wheel of a baby walker according to a preferred embodiment of the present invention.
Figure 6C:
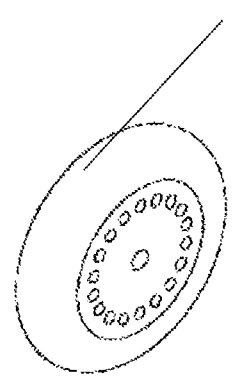
FIG. 6C shows a perspective vim of a wheel of a baby walker according to a preferred embodiment of the present invention.
Figure 6D:
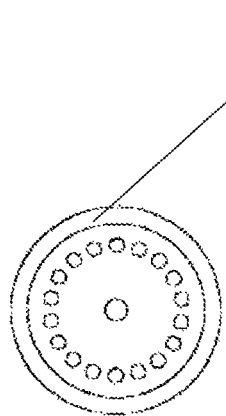
FIG. 6D shows a side view of the wheel of FIG. 6A.
Figure 6E:
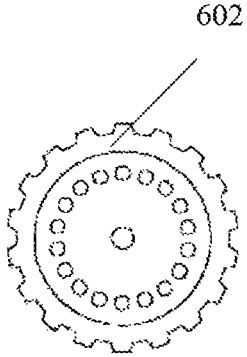
FIG. 6E shows a side view of the wheel of FIG. 6B.
Figure 6F:
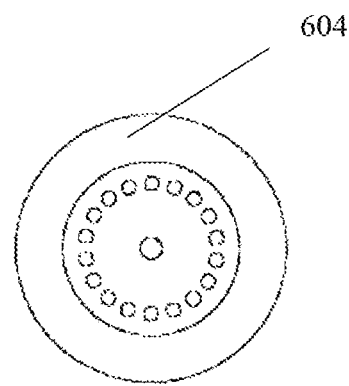
FIG. 6F shows a side view of the wheel of FIG. 6C.

FIGS. 6A through 6A depict different preferred embodiments of a wheel that may be used in a wheel assembly. Specifically, FIGS. 6A through 6C show perspective views of different wheels that include a plurality of holes that may be used in a braking system. FIGS. 6D through 6F are the side views of FIGS. 6A through 6C, respectively. These wheels have different configurations, each being suitable for a different surface.

Figure 7:
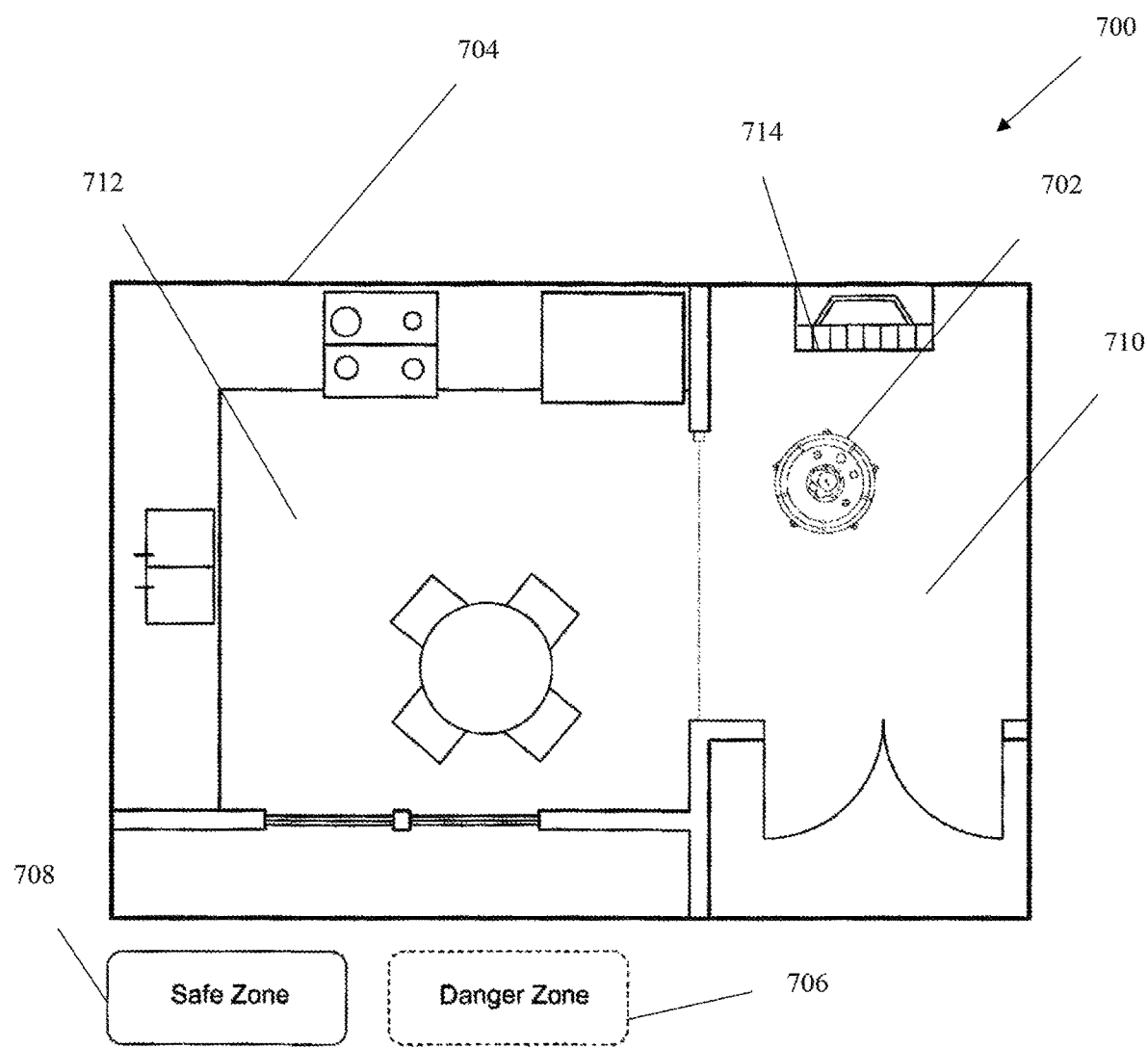
FIG. 7 shows a schematic representation of a floor plan of a house including different regions within which a baby walker may be monitored and controlled according to a preferred embodiment of the present invention.

Utilizing the baby walker 100 described above and referring to FIGS. 7 through 9, three embodiments of a method of monitoring and controlling a baby walker is now described. FIG. 7 depicts a schematic representation of a user interface 700 that shows a floor plan of a house 704 including a baby room 710 and a living room 712. A baby walker 702 is shown in the baby room 710. The user interface 700 also provides a Danger Zone box 706 and a Safe Zone box 708. The user may use the user interface 700 to designate the baby room 710 as a safe zone by clicking on the Safe Zone box 708 and to designate the living room 712 as a dangerous area by clicking on the Danger Zone box 706. In a preferred embodiment, the user interface 700 is a program application (APP) that can be executed on an external device, such as a smart phone, a tablet, or a desktop computer.

The baby walker 702 is equipped with proximity sensors, position sensors, and weight sensors to ascertain the surrounding conditions, such as proximity of objects, terrain, its position with respect to a starting position or predefined regions, and the presence or absence of the baby inside the baby walker 702. For instance, a proximity sensor detects an object 714 and generates a proximity signal where a controller, such as the controller 136, receives the signal applies a brake signal to at least one of the plurality of wheel assemblies to one, of substantially slow and stop, the baby walker 702 when a first distance between the object 714 and the baby walker 702 is less than a first predetermined value. The first predetermined value maybe stored on a storage device of the controller 136 or may be communicated to the controller via a communication module such as the communication module 142.

The user may also desire to limit the movements of the baby walker 702 to within a radius of, say, 5 feet. The user may utilize the user interface to communicate the predetermined value of 5 feet and the present position of the baby walker 702, as the starting position of the baby walker 702, to the controller 136, via the communication module 142. The position sensor, detecting the position of the baby walker 702, generates a position signal, the controller 136 receives the position signal, and applies the brake signal to at least one of the plurality of wheel assemblies to one of substantially slow and stop the baby walker 702 when the distance between the position of the baby walker 702 and the starting position of the baby walker 702 is greater than 5 feet.

The user may alternatively desire to limit the movements of the baby walker 702 to within a predetermined region, say the baby room 710. The user may utilize the user interface to communicate the predetermined region to the controller 136, via the communication module 142. The position sensor, detecting the position of the baby walker 702, generates a position signal, the controller 136 receives the position signal, and is configured to apply the brake signal to at least one of the plurality of wheel assemblies to one of substantially slow and stop the baby walker 702 when a coordinate of the position resides outside of the baby room 710. Alternatively, the user may choose the living room 712 to be the predetermined region and the controller 136 is configured to apply the brake signal to at least one of the plurality of wheel assemblies to one of substantially slow and stop the baby walker 702 when a coordinate of the position resides inside of the living room 712.

The weight of a baby seated inside the baby walker 702 is also monitored and communicated via the communication module 142. For instance, if the baby walker tips over or someone abducts the baby, the weight sensor, detecting the weight of the baby, generates a weight signal a weight, the controller 136 receives the weight signal and is configured to transmit a warning signal when the weight is less than a predetermined values, for example, 8 pounds. Alternatively, the controller 136 may generate a loud sound via an internal speaker.

FIG. 8 depicts a schematic representation 800 of a user 802 utilizing a mobile device 804 to execute a user interface to restrict the movements of a baby walker 812 to within a predetermined region 810 of arbitrary shape that has been drawn by the user 802 on the mobile device 804 via the user interface. According to this embodiment, a controller is configured to apply a brake signal to the at least one of the plurality of wheel assemblies to one of substantially slow and stop the baby walker 812 when a coordinate of the position resides outside of the predetermined region 810.

Figure 9:
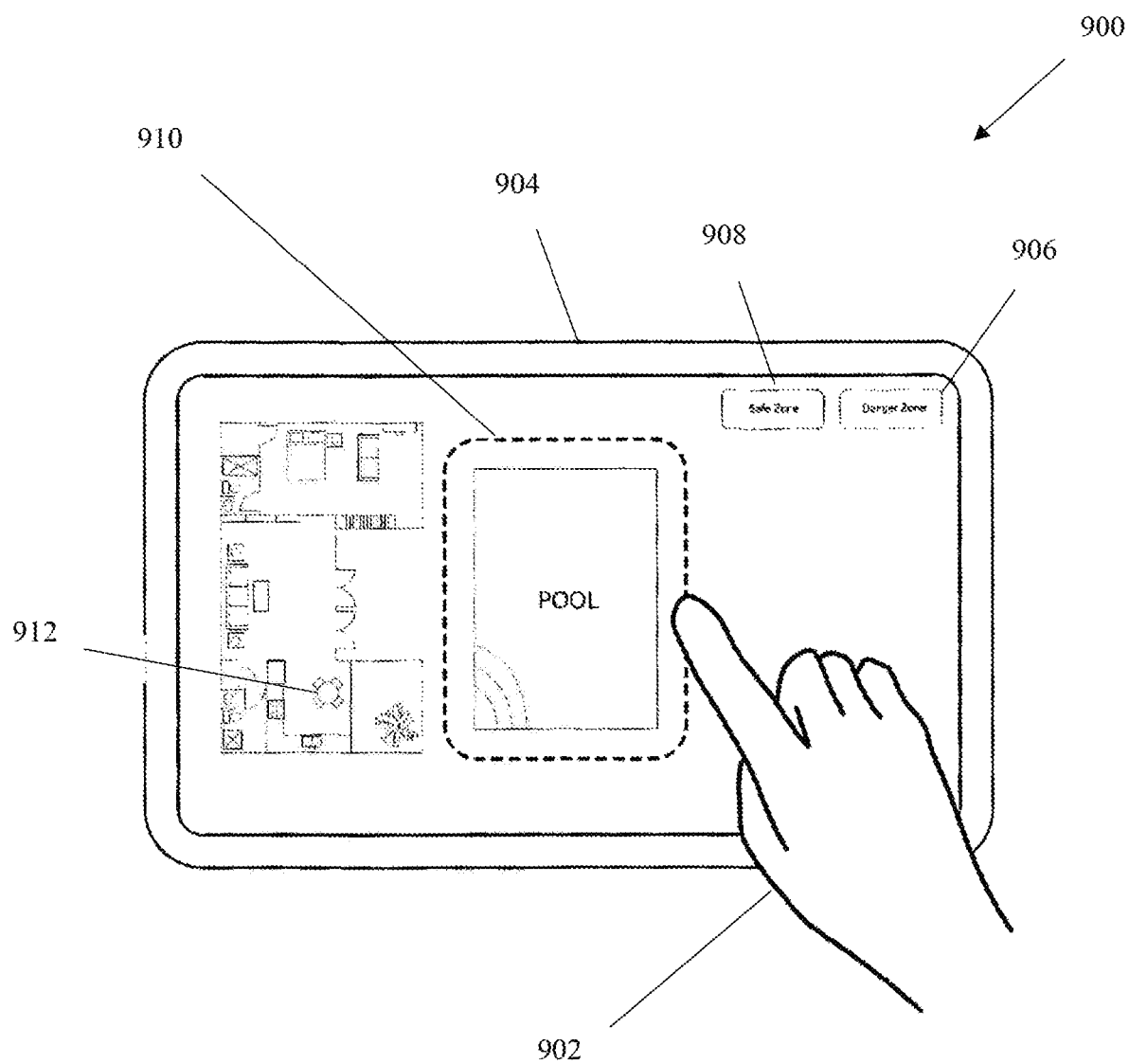
FIG. 9 shows a schematic representation of a user designating regions within which a baby walker may be monitored and controlled according to a preferred embodiment of the present invention.

FIG. 9 depicts a schematic representation 900 of a user 902 utilizing a desktop 904 to execute a user interface to restrict the movements of a baby walker 912 to outside of a predetermined region 910, which in this case is a swimming pool. A Danger Zone box 906 and a Safe Zone box 908 may be utilized to designate different regions accordingly. According to this embodiment, a controller is configured to apply a brake signal to the at least one of the plurality of wheel assemblies to one of substantially slow and stop the baby walker 812 when a coordinate of the position resides inside of the swimming pool 910.

The foregoing explanations, descriptions, illustrations, examples, and discussions have been set forth to assist the reader with understanding this invention and further to demonstrate the utility and novelty of it and are by no means restrictive of the scope of the invention. It is the following claims, including all equivalents, which are intended to define the scope of this invention.

What is claimed is:

1. A baby walker, comprising:
   a walking assembly including a plurality of wheel assemblies;
   a proximity sensor operative to detect an object and generate a proximity signal; and
   a controller, including a processing unit and program code stored on a storage device of said controller, said controller is coupled with the proximity sensor and at least one of the plurality of wheel assemblies;
   wherein the controller is configured to receive the proximity signal, via the proximity sensor, and to apply a brake signal to the at least one of the plurality of wheel assemblies to one of substantially slow and stop the baby walker when a first distance between the object and the baby walker is less than a first predetermined value;
   a weight sensor operative to detect a weight of a baby and generate a weight signal; and
   a communication module operative to at least one of receive and transmit radio waves;
   wherein the controller is further coupled with the weight sensor and the communication module and further configured to receive the weight signal, via the weight sensor, and to transmit a warning signal, via the communication module when the weight is less than a second predetermined value.

2. The baby walker of claim 1, wherein the walking assembly comprises:
   an upper member;
   a seat rotatably coupled with the upper member; and
   a lower member coupled with the upper member;
   wherein the plurality of wheel assemblies are coupled with the lower member.

3. The baby walker of claim 2, wherein the at least one of the plurality of wheel assemblies comprises:
   a housing rotatably coupled with the lower member;
   a wheel rotatably coupled with the housing; and
   a braking system operative to engage the wheel to one of substantially slow and stop the wheel.

4. The baby walker of claim 3, wherein the wheel comprises a plurality of holes disposed circumferentially around a center of the wheel and wherein the braking system is a solenoid actuator operative to receive the brake signal and actuate a rod into one of the plurality of holes to stop the baby walker.

5. The baby walker of claim 3, wherein the braking system is an electrical motor having a shaft rotatably coupled with the wheel and wherein the motor is operative to receive the brake signal and apply a torque on the shaft to substantially slow the baby walker.

6. The baby walker of claim 1, wherein the proximity sensor comprises one of an infrared sensor and an ultrasonic sensor.

7. A method of walking a baby via a baby walker, comprising:
   providing a walking assembly including a plurality of wheel assemblies;
   providing a proximity sensor operative to detect an object and generate a proximity signal; and
   providing a controller, including a processing unit and program code stored on a storage device of said controller, said controller is coupled with the proximity sensor and at least one of the plurality of wheel assemblies;
   wherein the controller is configured to receive the proximity signal, via the proximity sensor, and to apply a brake signal to the at least one of the plurality of wheel assemblies to one of substantially slow and stop the baby walker when a first distance between the object and the baby walker is less than a first predetermined value;
   providing a weight sensor operative to detect a weight of a baby and generate a weight signal; and
   providing a communication module operative to at least one of receive and transmit radio waves;
   wherein the controller is further coupled with the weight sensor and the communication module and further configured to receive the weight signal, via the weight sensor, and to transmit a warning signal, via the communication module when the weight is less than a second predetermined value.

8. A baby walker, comprising:
   a walking assembly including a plurality of wheel assemblies;
   a position sensor operative to detect a position of the baby walker and generate a position signal; and
   a controller, including a processing unit and program code stored on a storage device of said controller, said controller is coupled with the position sensor and at least one of the plurality of wheel assemblies;
   a weight sensor operative to detect a weight of a baby and generate a weight signal; and
   a communication module operative to at least one of receive and transmit radio waves;
   wherein the controller is further coupled with the weight sensor and the communication module and configured to receive the weight signal, via the weight sensor, and to transmit a warning signal, via the communication module when the weight is less than a predetermined weight value;
   wherein the controller is further configured to receive the position signal, via the position sensor, and to apply a brake signal to the at least one of the plurality of wheel assemblies to one of substantially slow and stop the baby walker when at least one of:
   a distance between the position and a starting position of the baby walker is greater than a predetermined value;
   a coordinate of the position resides inside of a predetermined region; and
   a coordinate of the position resides outside of a predetermined region.

9. A method of monitoring and controlling a baby walker, said baby walker comprising a walking assembly including a plurality of wheel assemblies, a position sensor, a weight sensor, a communication module, and a controller, said method comprising:
   detecting a position of the baby walker, via the position sensor;
   detecting a weight of a baby, via the weight sensor, and generating a weight signal;
   receiving the weight signal by the controller, and transmitting a warning signal, via the communication module, when the weight is less than a predetermined weight value;
   generating a position signal, via the position sensor;
   receiving the position signal, via the controller; and
   applying a brake signal to at least one of the plurality of wheel assemblies to one of substantially slow and stop the baby walker when at least one of:
   a distance between the position and a starting position of the baby walker is greater than a predetermined value;
   a coordinate of the position resides inside of a predetermined region; and a coordinate of the position resides outside of a predetermined region;
via the controller.

\* \* \* \* \*